US012564981B2

(12) United States Patent
Glanzer et al.

(10) Patent No.: US 12,564,981 B2
(45) Date of Patent: Mar. 3, 2026

(54) LOG SPLITTER

(71) Applicant: MILWAUKEE ELECTRIC TOOL CORPORATION, Brookfield, WI (US)

(72) Inventors: Evan M. Glanzer, Milwaukee, WI (US); Travis S. Mergener, Horicon, WI (US); Ian C. Richards, Milwaukee, WI (US); Joseph William Miller, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 192 days.

(21) Appl. No.: 18/351,903

(22) Filed: Jul. 13, 2023

(65) Prior Publication Data

US 2024/0017439 A1 Jan. 18, 2024

Related U.S. Application Data

(60) Provisional application No. 63/389,222, filed on Jul. 14, 2022.

(51) Int. Cl.
*B27L 7/06* (2006.01)

(52) U.S. Cl.
CPC ..................................... *B27L 7/06* (2013.01)

(58) Field of Classification Search
CPC .................................... B27L 7/00; B27L 7/06
See application file for complete search history.

(56) References Cited

U.S. PATENT DOCUMENTS

| | | | | |
|---|---|---|---|---|
| 2,386,508 A | | 10/1945 | Ripley | |
| 2,478,829 A | | 8/1949 | Lechtenberg | |
| 2,930,322 A | | 3/1960 | Spencer | |
| 3,040,590 A | | 6/1962 | Smithburn | |
| 3,254,746 A | | 6/1966 | Myers | |
| 4,145,864 A | | 3/1979 | Brewster, Jr. | |
| 4,351,377 A | * | 9/1982 | Hamel | B27L 7/00 144/195.1 |
| 4,500,226 A | | 2/1985 | Romand-Monnier et al. | |
| 4,759,560 A | | 7/1988 | Virgulti | |
| 4,810,174 A | | 3/1989 | Stuckey et al. | |
| 4,848,961 A | | 7/1989 | Rouillard | |
| 4,861,188 A | | 8/1989 | Rouillard | |
| 5,111,127 A | | 5/1992 | Johnson | |
| D375,963 S | | 11/1996 | Braun et al. | |
| 5,583,416 A | | 12/1996 | Klang | |
| 5,725,304 A | | 3/1998 | Inai | |

(Continued)

FOREIGN PATENT DOCUMENTS

| | | |
|---|---|---|
| CN | 201937372 U | 8/2011 |
| DE | 4126311 A1 | 2/1993 |

(Continued)

*Primary Examiner* — Matthew Katcoff
(74) *Attorney, Agent, or Firm* — Michael Best & Friedrich LLP

(57) ABSTRACT

A powered log splitter includes a support structure configured to support a log, a ram that is operable to engage and split the log, a hydraulic drive unit to actuate the ram, and a stand-alone motor unit to power the hydraulic drive unit. The stand-alone motor unit includes a housing, an electric motor located within the housing, and a battery pack removably coupled to the housing. The battery pack is configured to supply electrical current to the electric motor.

20 Claims, 15 Drawing Sheets

(56) References Cited

U.S. PATENT DOCUMENTS

| | | | |
|---|---|---|---|
| 5,765,671 A | 6/1998 | Endo et al. | |
| 5,787,693 A | 8/1998 | Dyke | |
| 5,819,513 A | 10/1998 | Braun et al. | |
| 5,894,715 A | 4/1999 | Braun et al. | |
| 6,139,217 A | 10/2000 | Reuter | |
| 6,263,979 B1 | 7/2001 | Dyke et al. | |
| 6,296,467 B1 | 10/2001 | Rouillard | |
| 6,478,101 B1 | 11/2002 | Taniguchi et al. | |
| 6,534,958 B1 | 3/2003 | Graber et al. | |
| 6,543,926 B2 | 4/2003 | Sherez | |
| 6,606,845 B1 | 8/2003 | Spies | |
| 6,707,203 B2 | 3/2004 | Wickham | |
| 6,751,109 B2 | 6/2004 | Doss et al. | |
| 6,922,981 B1 | 8/2005 | Tyree | |
| 6,928,353 B2 | 8/2005 | Finley et al. | |
| 6,963,153 B1 | 11/2005 | Su | |
| 7,021,599 B2 | 4/2006 | Degrazia et al. | |
| 7,097,384 B2 | 8/2006 | Lindley | |
| 7,153,058 B2 | 12/2006 | Lindley | |
| 7,309,928 B2 | 12/2007 | Grant et al. | |
| 7,526,833 B2 | 5/2009 | Cochran et al. | |
| 7,539,570 B2 | 5/2009 | Normann | |
| 7,549,822 B2 | 6/2009 | Rouillard | |
| 7,572,082 B2 | 8/2009 | Rouillard | |
| 7,621,194 B1 | 11/2009 | Tyree | |
| 7,653,963 B2 | 2/2010 | Cochran et al. | |
| 7,659,696 B2 | 2/2010 | Zeiler et al. | |
| 7,677,017 B2 | 3/2010 | Holby | |
| 7,738,979 B2 | 6/2010 | Schmuck et al. | |
| 7,832,513 B2 | 11/2010 | Verbrugge et al. | |
| 7,856,714 B2 | 12/2010 | Hyde et al. | |
| 8,303,266 B2 | 11/2012 | Rush et al. | |
| 8,365,350 B2 | 2/2013 | Cochran et al. | |
| 8,575,800 B1 | 11/2013 | Fox et al. | |
| 8,601,685 B2 | 12/2013 | Hyde et al. | |
| 8,757,925 B2 | 6/2014 | Banchio | |
| 8,910,459 B2 | 12/2014 | Abe et al. | |
| 9,030,040 B2 | 5/2015 | Tarasinski et al. | |
| 9,063,530 B2 | 6/2015 | Lougheed et al. | |
| 9,139,966 B1 | 9/2015 | Mikowychok | |
| 9,382,689 B2 * | 7/2016 | Chapman | E02F 9/202 |
| 9,397,531 B2 | 7/2016 | Mikowychok | |
| 9,510,504 B2 | 12/2016 | Morita et al. | |
| 9,991,825 B1 | 6/2018 | Ackerman et al. | |
| 10,836,069 B2 * | 11/2020 | Banjo | B27L 7/06 |
| 11,673,288 B2 * | 6/2023 | Coolbaugh | B27L 7/06<br>144/195.1 |
| 2002/0079853 A1 | 6/2002 | Schmitz et al. | |
| 2003/0144774 A1 | 7/2003 | Trissel et al. | |
| 2003/0209645 A1 | 11/2003 | Degrazia et al. | |
| 2004/0035625 A1 | 2/2004 | Talbot et al. | |
| 2005/0156564 A1 | 7/2005 | Krieger | |
| 2006/0048601 A1 | 3/2006 | Chiao | |
| 2006/0288680 A1 | 12/2006 | Holby | |
| 2007/0120366 A1 | 5/2007 | Grant et al. | |
| 2007/0130899 A1 | 6/2007 | Osborne | |
| 2008/0012521 A1 | 1/2008 | Katsumata et al. | |
| 2008/0038073 A1 | 2/2008 | Paolicelli | |
| 2008/0120955 A1 | 5/2008 | Lucas et al. | |
| 2008/0141542 A1 | 6/2008 | Hung | |
| 2008/0143201 A1 | 6/2008 | Ramy et al. | |
| 2008/0250570 A1 | 10/2008 | Dayton et al. | |
| 2008/0253221 A1 | 10/2008 | Lindley | |
| 2009/0028653 A1 | 1/2009 | Wilbert et al. | |
| 2009/0283343 A1 | 11/2009 | Wurth | |
| 2010/0025131 A1 | 2/2010 | Gloceri et al. | |
| 2010/0058726 A1 | 3/2010 | Notaras et al. | |
| 2010/0326481 A1 | 12/2010 | Buckner | |
| 2011/0094129 A1 | 4/2011 | Rowe et al. | |
| 2011/0115436 A1 | 5/2011 | Zhang et al. | |
| 2012/0007457 A1 | 1/2012 | Andersson et al. | |
| 2012/0227994 A1 | 9/2012 | Yang et al. | |
| 2012/0256568 A1 | 10/2012 | Lee | |
| 2012/0318600 A1 | 12/2012 | Hakamata et al. | |
| 2013/0036727 A1 | 2/2013 | Heichel et al. | |
| 2013/0180495 A1 | 7/2013 | Veerathappa et al. | |
| 2014/0095002 A1 | 4/2014 | Crecelius et al. | |
| 2014/0241105 A1 | 8/2014 | Jin | |
| 2015/0003135 A1 | 1/2015 | Chen et al. | |
| 2015/0017632 A1 | 1/2015 | Matsuzaki et al. | |
| 2015/0061413 A1 | 3/2015 | Janarthanam et al. | |
| 2015/0084606 A1 | 3/2015 | Nakamura et al. | |
| 2015/0165602 A1 | 6/2015 | Seith et al. | |
| 2015/0171632 A1 | 6/2015 | Fry et al. | |
| 2015/0207431 A1 | 7/2015 | Brotto et al. | |
| 2015/0231975 A1 | 8/2015 | Ishii et al. | |
| 2015/0314692 A1 | 11/2015 | Inoue | |
| 2015/0316913 A1 | 11/2015 | Rickey et al. | |
| 2016/0007525 A1 | 1/2016 | Drew et al. | |
| 2016/0020443 A1 | 1/2016 | White et al. | |
| 2016/0061227 A1 | 3/2016 | Spohr | |
| 2016/0242356 A1 | 8/2016 | Velderman et al. | |
| 2017/0015455 A1 | 1/2017 | Baskin et al. | |
| 2017/0120435 A1 | 5/2017 | Palich et al. | |
| 2017/0136864 A1 | 5/2017 | Ito et al. | |
| 2017/0271939 A1 | 9/2017 | Kaneko et al. | |
| 2017/0271941 A1 | 9/2017 | Kaneko et al. | |
| 2017/0306575 A1 | 10/2017 | Utterodt et al. | |
| 2018/0138839 A1 | 5/2018 | Puzio et al. | |
| 2018/0263433 A1 | 9/2018 | Osborne, Jr. | |
| 2018/0331597 A1 | 11/2018 | Schulenberg | |
| 2019/0237715 A1 | 8/2019 | Seman, Jr. et al. | |
| 2019/0238083 A1 | 8/2019 | White et al. | |
| 2019/0290210 A1 | 9/2019 | Mclaughlin | |
| 2020/0076337 A1 | 3/2020 | Abbott et al. | |

FOREIGN PATENT DOCUMENTS

| | | | |
|---|---|---|---|
| EP | 0192469 | A2 | 8/1986 |
| EP | 1304026 | B1 | 4/2003 |
| EP | 2072192 | A1 | 6/2009 |
| EP | 1267001 | B1 | 9/2009 |
| EP | 3322086 | A2 | 5/2018 |
| EP | 3523869 | A1 | 8/2019 |
| JP | 4193683 | B2 | 6/2005 |
| JP | 4337522 | B2 | 6/2005 |
| WO | 91002845 | A1 | 3/1991 |
| WO | 2008113101 | A1 | 9/2008 |
| WO | 2013043117 | A1 | 3/2013 |
| WO | 2014157463 | A1 | 10/2014 |
| WO | 2016145324 | A1 | 9/2016 |
| WO | 2017220009 | A1 | 12/2017 |
| WO | 2018067506 | A1 | 4/2018 |
| WO | 2018067986 | A1 | 4/2018 |
| WO | 2018081397 | A1 | 5/2018 |
| WO | 2018085411 | A1 | 5/2018 |
| WO | 2018165453 | A1 | 9/2018 |
| WO | 2019058439 | A1 | 3/2019 |

* cited by examiner

LOG SPLITTER

CROSS-REFERENCE TO RELATED APPLICATIONS

This application claims priority to U.S. Provisional Patent Application No. 63/389,222 filed on Jul. 14, 2022, the entire content of each of which is incorporated herein by reference.

BACKGROUND

The present disclosure relates to log splitters, and more particularly to log splitters including a motor unit.

SUMMARY

The present disclosure provides, in one aspect, a powered log splitter including a support structure configured to support a log, a ram that is operable to engage and split the log, a hydraulic drive unit to actuate the ram, and a stand-alone motor unit to power the hydraulic drive unit. The stand-alone motor unit includes a housing and an electric motor located within the housing and a battery pack removably coupled to the housing. The battery pack is configured to supply electrical current to the electric motor.

The present disclosure, in another aspect, provides a method of operating a log splitter including a hydraulic drive unit and a stand-alone motor unit to power the log splitter. The stand-alone motor unit includes an electric motor and a battery pack to supply electrical current to the electric motor. The method includes providing an actuator to activate the hydraulic drive unit, monitoring, with a controller, a first sensor signal from a first sensor configured to detect a first position of the actuator, monitoring, with the controller, a second sensor signal from a second sensor configured to detect a second position of the actuator, commanding, in response to an absence of the first sensor signal or the second sensor signal, the electric motor to operate at a first power level, and commanding, in response to the controller detecting either the first sensor signal or the second sensor signal, the electric motor to operate at a second power level.

The present disclosure, in another aspect, provides a method of operating a log splitter including a hydraulic drive unit and a stand-alone motor unit to power the log splitter. The motor unit including an electric motor and a battery pack to supply electrical current to the electric motor. The method including providing an actuator to activate the hydraulic drive unit, monitoring, with a controller, a sensor signal from a sensor configured to measure a characteristic of the electric motor, commanding, in response to the sensor signal exceeding a predetermined value, the electric motor to operate at a first power level, and commanding, in response to the sensor signal falling below the predetermined value, the electric motor to operate at a second power level.

The present disclosure, in another aspect, provides a method of operating a log splitter including a hydraulic drive unit and a stand-alone motor unit to power the log splitter. The motor unit including a motor and a battery pack to supply electrical current to the electric motor. The method including providing an actuator to activate the hydraulic drive unit, monitoring, with a controller, a sensor signal from a sensor configured to measure a characteristic of a hydraulic fluid within the hydraulic drive unit, commanding, in response to the sensor signal exceeding a predetermined value, the electric motor to operate at a first power level, and commanding, in response to the sensor signal falling below the predetermined value, the electric motor to operate at a second power level.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1A:
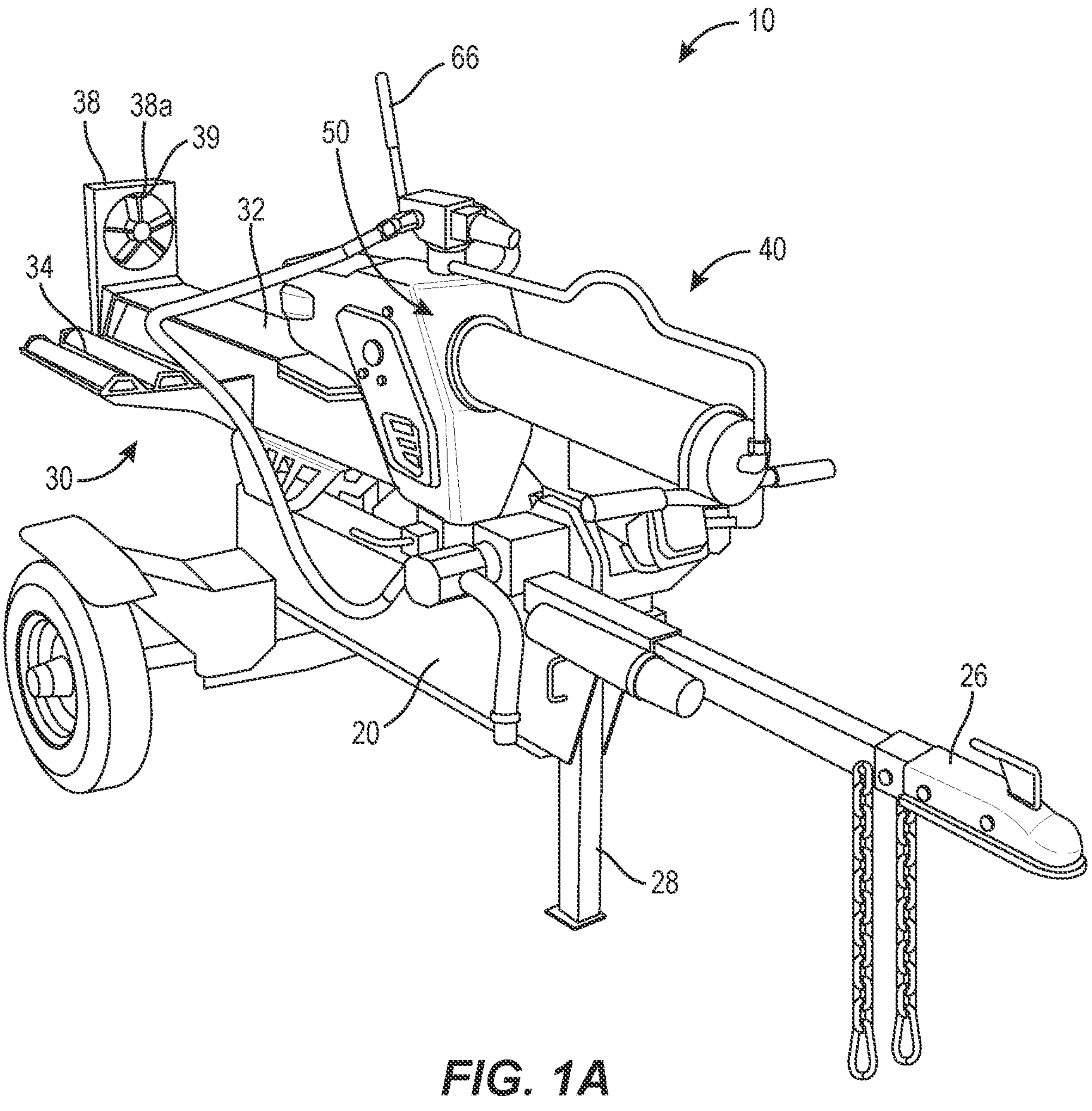
FIG. 1A is a first perspective view of a log splitter.
Figure 1B:
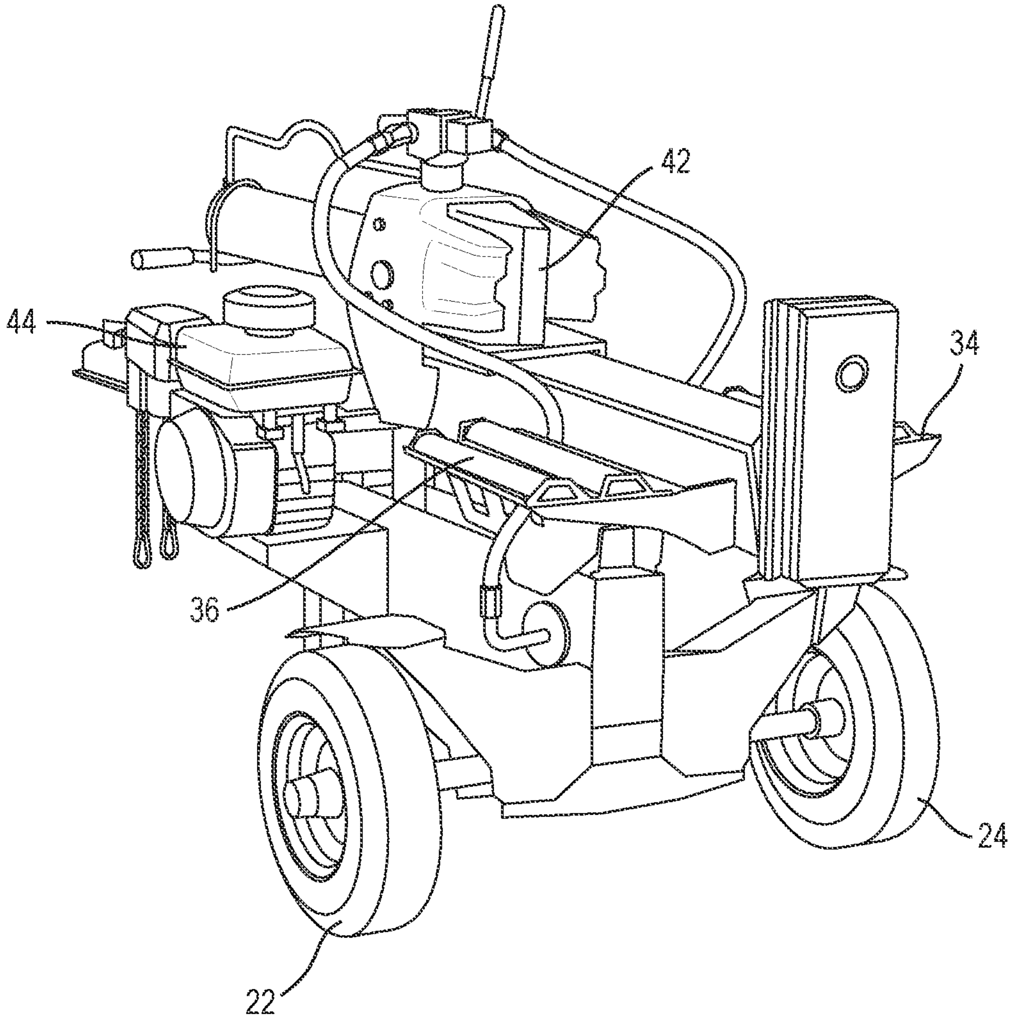
FIG. 1B is a second perspective view of the log splitter of FIG. 1A.
Figure 2:
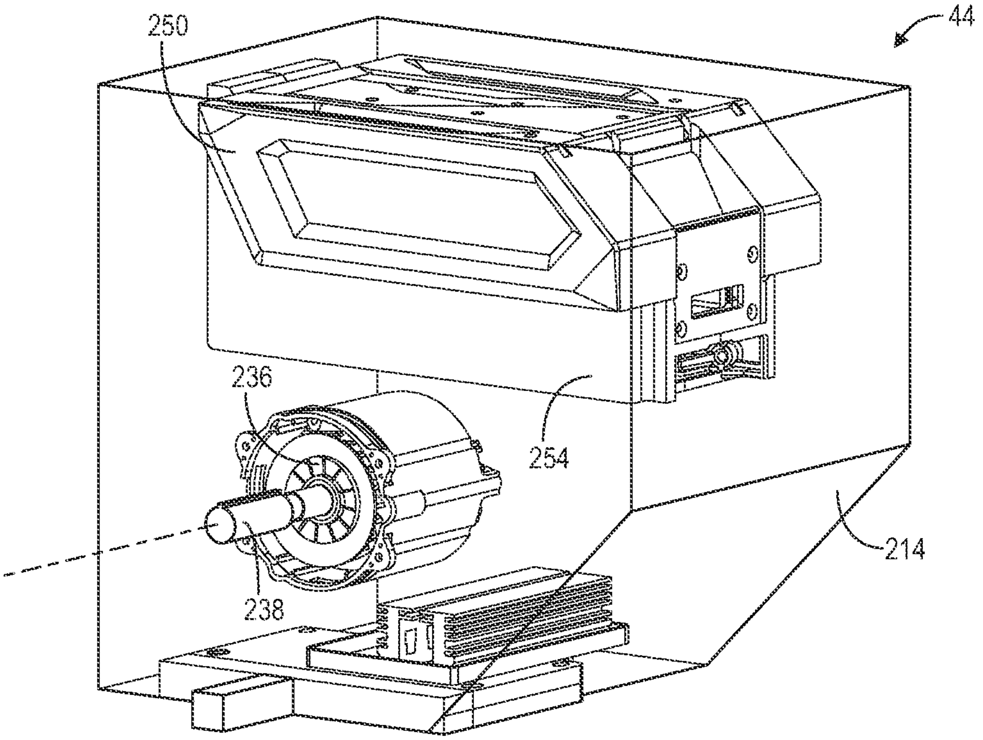
FIG. 2 is a perspective view of a stand-alone motor unit for use with the log splitter of FIG. 1.

With reference to FIGS. 1A and 1B, a log splitter 10 in accordance with an embodiment of the disclosure includes a frame 20, a support structure 30 supported by the frame 20, and a splitting unit 40 coupled to the support structure 30. The support structure 30 includes a main support 32 coupled to the splitting unit 40 at a first end of the main support 32, a first side support 34 coupled to the main support 32 at a first side of the main support 32, and a second side support 36 (FIG. 1B) coupled to the main support 32 at a second side of the main support 32. The support structure 30 further includes a stop block 38 coupled to a second end of the main support 32. The stop block 38 includes catch 38*a* including a plurality of blades 39 configured to engage a log and prevent the log from sliding with respect to the stop block 38.

The splitting unit 40 includes a hydraulic drive unit 50 and a ram 42 (FIG. 1B) driven by the hydraulic drive unit 50 to engage and split a log that is situated on the main support 32 between the ram 42 and the stop block 38. The ram 42 includes a wedge shape, or is shaped like a blade, to facilitate splitting logs supported on the main support 32. The hydraulic drive unit 50 includes an actuator (i.e., lever 66) operable by a user to drive the ram 42 to split the log and, after the splitting process is completed, retract the ram 42 for a subsequent log-splitting process.

In the illustrated embodiment, a first wheel 22 and a second wheel 24 (FIG. 1B) are coupled to the frame 20 and a trailer hitch 26 (FIG. 1A) is coupled to the frame 20, such that the log splitter 10 can be removably coupled to a vehicle for towing. A support leg 28 is coupled to the frame 20 and pivotable between a first position, in which the leg 28 extends away from the frame 20, and a second position, in which the leg 28 is stowed against the frame 20.

Figure 3:
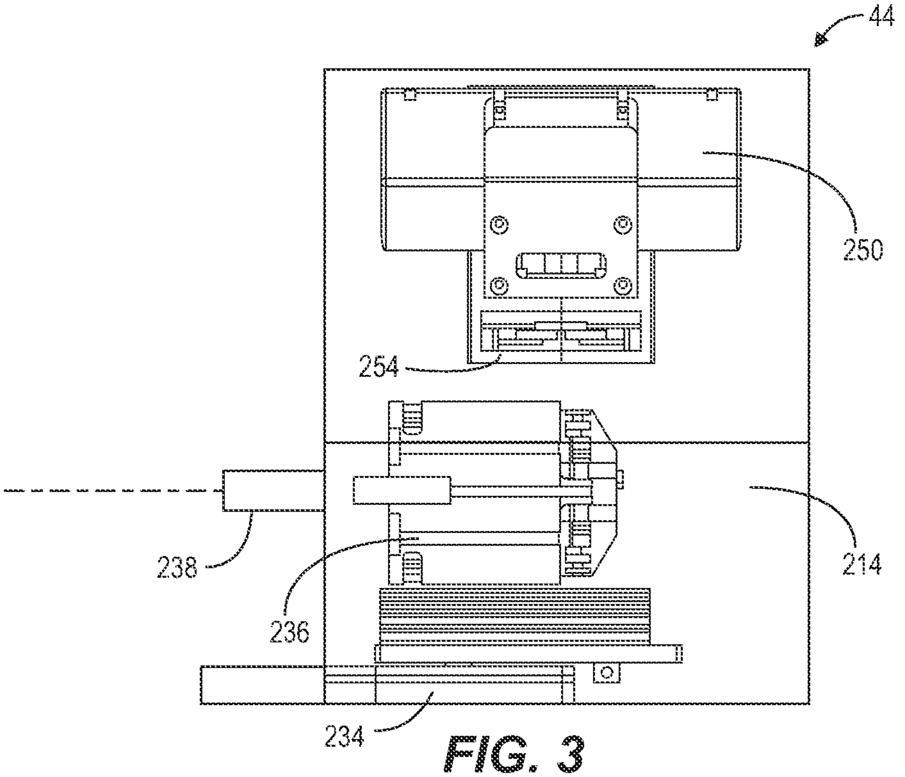
FIG. 3 is a plan view of the stand-alone motor unit of FIG. 2.

With reference to FIGS. 2-7 the log splitter 10 includes a stand-alone motor unit 44 to power and drive the hydraulic drive unit 50 of the splitting unit 40. The motor unit 44 is like the stand-alone motor unit disclosed in U.S. Application Publication No. 2020/0076337, the entire content of which is incorporated herein by reference. The motor unit 44 includes a housing 214, a flange 234 coupled to the housing 214, an electric motor 236 located within the housing 214, and a power take-off shaft 238 that protrudes from the housing 214 and receives torque from the motor 236. As shown in FIG. 3, the motor unit 44 also includes control electronics 242 positioned within the housing 214 and including wiring and a controller 246 that is electrically connected to the motor 236. In some embodiments, the control electronics 242 has a volume of up to about 820 $mm^3$. In some embodiments, the control electronics 242 has a weight of up to about 830 g.

Figure 4:
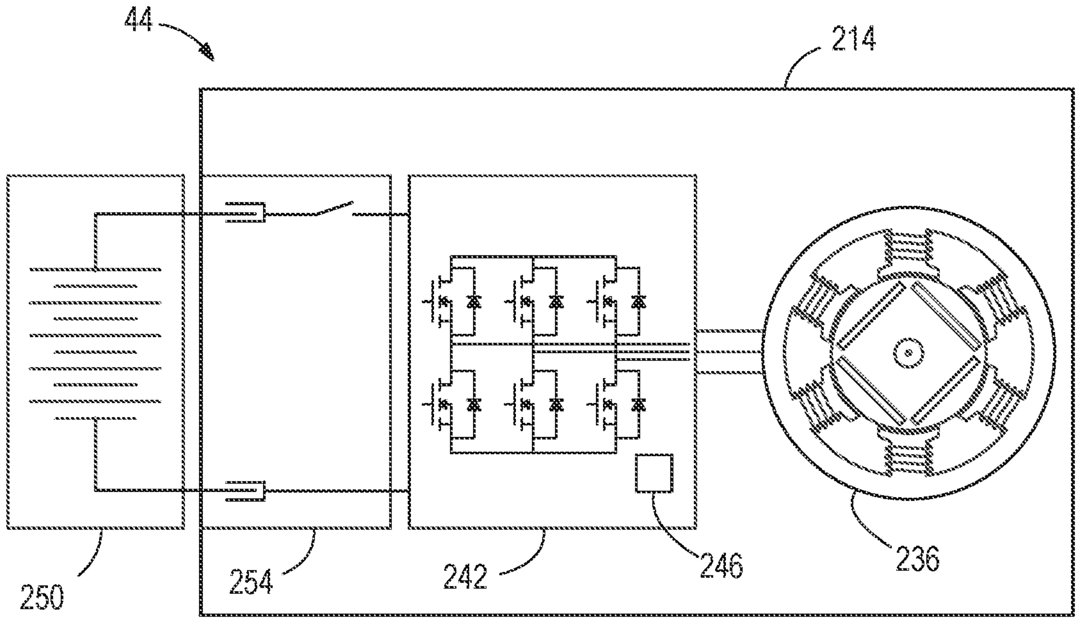
FIG. 4 is a schematic view of the stand-alone motor unit of FIG. 2.
Figure 5:
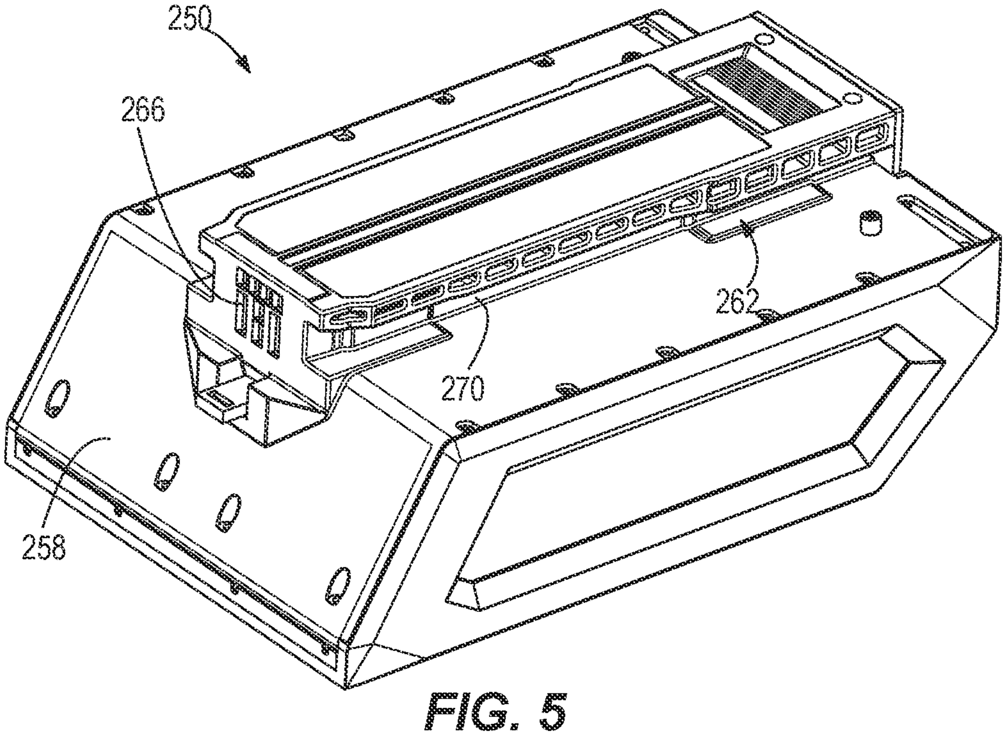
FIG. 5 is a perspective view of a battery pack of the stand-alone motor unit of FIG. 2.
Figure 6:
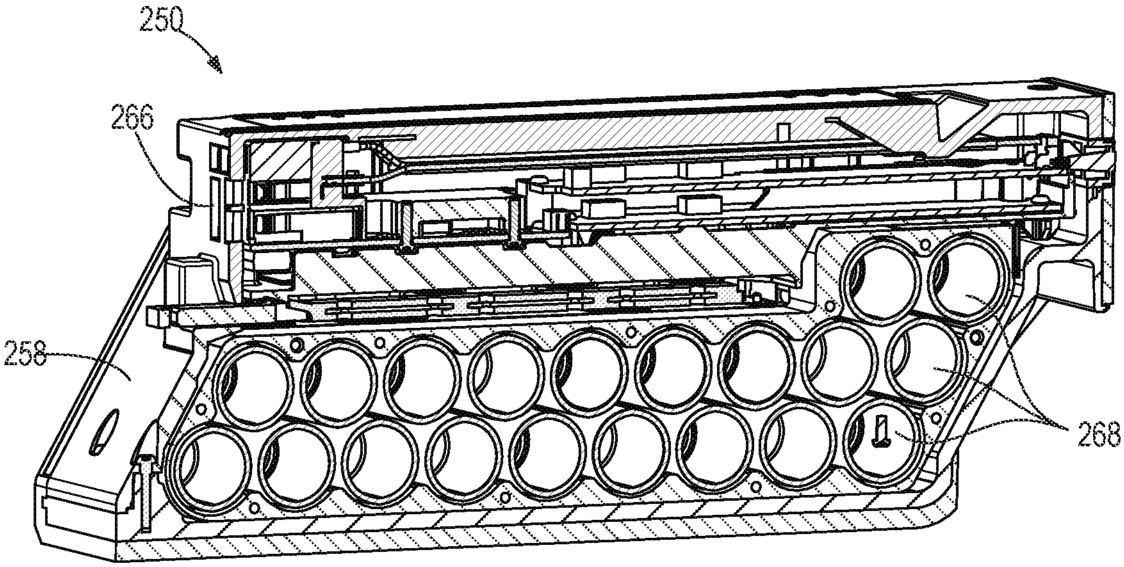
FIG. 6 is a cross-sectional view of the battery pack of FIG. 5.

As shown in FIGS. 2-6, the motor unit 44 also includes a battery pack 250 that is removably received in a battery receptacle 254 in the housing 214 to transfer electrical current from the battery pack 250 to the motor 236 via the control electronics 242. With reference to FIG. 4, in some embodiments, the control electronics 242 are able to electrically disconnect from the battery pack 250 through the battery receptacle 254. With reference to FIGS. 5 and 6, the battery pack 250 includes a battery pack housing 258 with a support portion 262 and a first terminal 266 that is electrically connected to a plurality of battery cells 268 supported by the pack housing 258. The support portion 262 provides a slide-on arrangement with a projection/recess portion 270. In some embodiments, the battery cells 268 have a nominal voltage of up to about 80 V. In some embodiments, the battery cells 268 have a nominal voltage of up to about 120 V. In some embodiments, the battery pack 250 has a weight of up to about 20 lb. In some embodiments, the battery pack 250 has a weight of up to about 13 lbs. In further embodiments, the batter pack has a weight of up to about 6 lbs. In some embodiments, each of the battery cells 268 has a diameter of up to 21 mm and a length of up to about 71 mm. In some embodiments, the battery pack 250 includes up to twenty battery cells 268. In some embodiments, the battery cells 268 are connected in series. In some embodiments, the battery cells 268 are operable to output a sustained operating discharge current of between about 40 A and about 60 A. In further embodiments, the battery cells 268 are operable to output a sustained operating discharge current less than 40 A or greater than 40 A. In some embodiments, each of the battery cells 268 has a capacity of between about 3.0 Ah and about 5.0 Ah.

Figure 7:
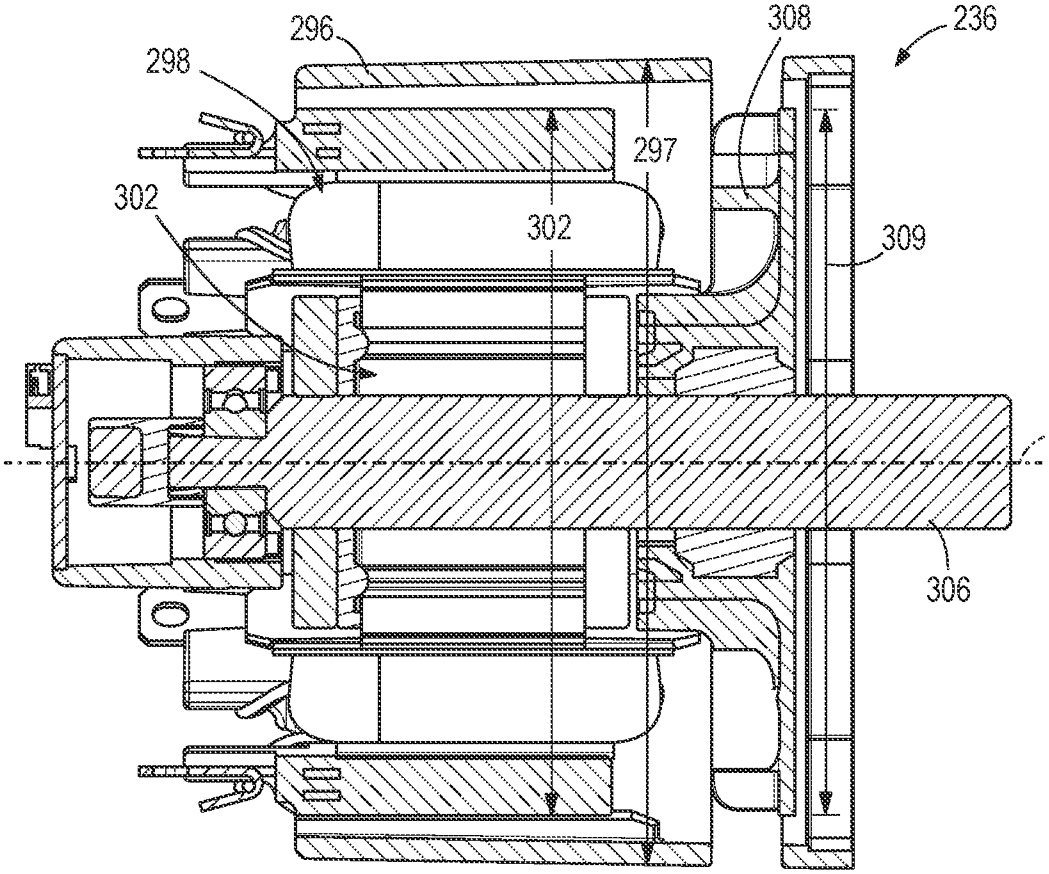
FIG. 7 is a cross-sectional view of a motor of the stand-alone motor unit of FIG. 2.

As shown in FIG. 7, the motor 236 includes a motor housing 296 having an outer diameter 297, a stator 298 having a nominal outer diameter 302 of up to about 80 mm, a rotor 304 having an output shaft 306 and supported for rotation within the stator 298, and a fan 308. In other embodiments, the stator 298 may have an outer diameter 302 that is in a range between 100 mm and 200 mm. In some embodiments, the motor 236 is a brushless direct current motor. In some embodiments, the motor 236 has a power output of at least about 500 W. In other embodiments, the motor 236 may have a power output of at least about 500 W. In some embodiments, the power output of the motor 236 may drop below 2760 W during operation. In some embodiments, the fan 308 has a diameter 309 that is larger diameter 297 of the motor housing 296. In some embodiments, the motor 236 can be stopped with an electronic clutch (not shown) for quick overload control. In some embodiments, the motor 236 has a volume of up to about 443,619 $mm^3$. In some embodiments, the motor 236 has a weight of up to about 4.6 lb. The housing 214 includes an inlet vent and an outlet vent, such that the motor fan 308 pulls air through the inlet vent and along the control electronics 242 to cool the control electronics 242, before the air is exhausted through the outlet vent. In the embodiment illustrated in FIG. 7, the motor 236 is a is an internal rotor motor, but in other embodiments, the motor 236 can be an outer rotor motor with a nominal outer diameter (i.e. the nominal outer diameter of the rotor) of up to about 80 mm.

Figure 8:
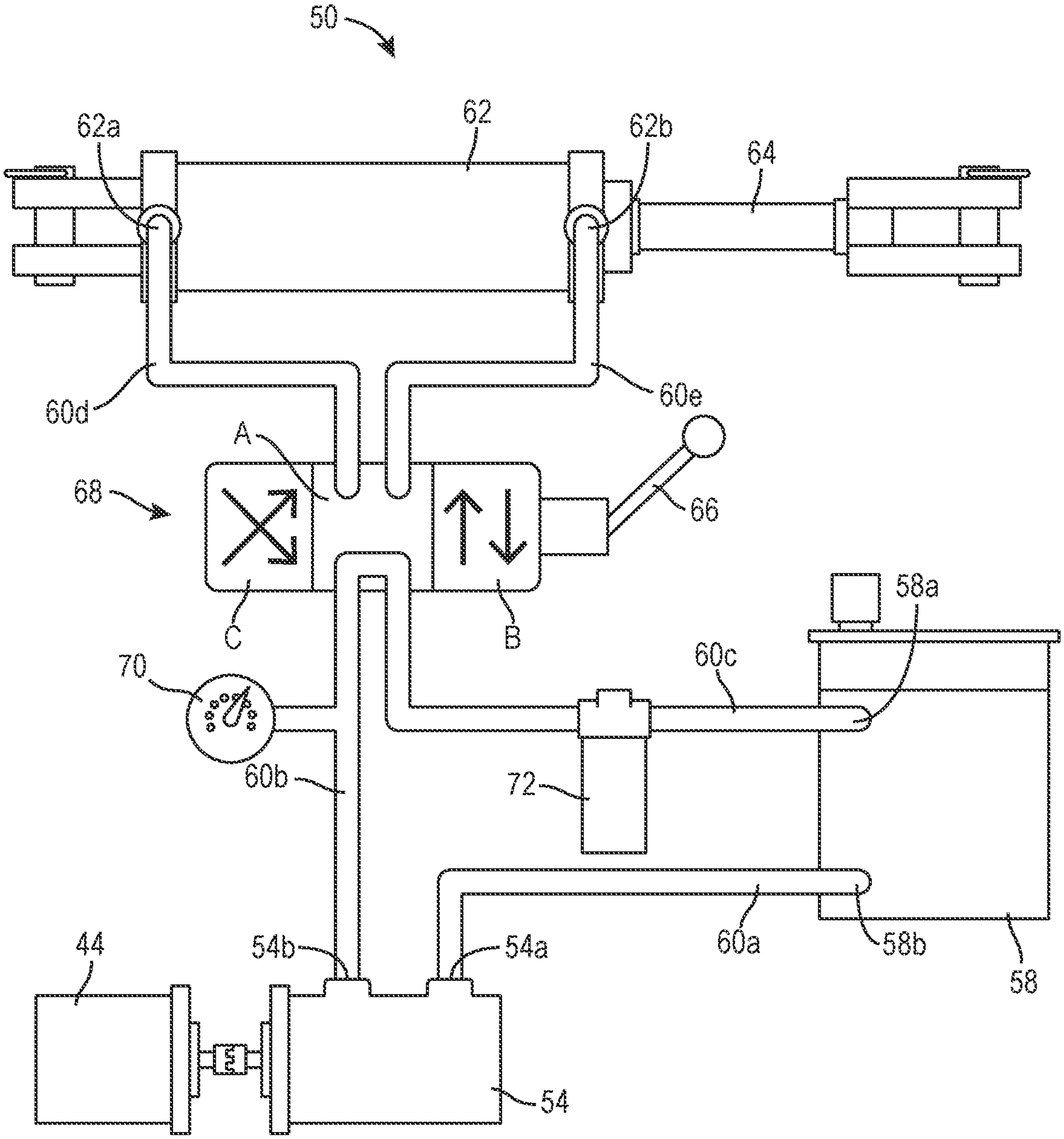
FIG. 8 is a schematic view of a hydraulic drive unit of the log splitter of FIG. 1A.

With reference to FIG. 8, the hydraulic drive unit 50 includes a two-stage pump 54 coupled to the motor unit 44. Specifically, the power take-off shaft 238 of the motor 236 is coupled to the pump 54 to drive the pump 54 to supply torque to the hydraulic drive unit 50. A hydraulic fluid reservoir 58 is in fluid communication with the pump 54 via a first pump conduit coupled between an inlet 54*a* of the pump 54 and an outlet 58*b* of the reservoir 58. The pump 54 is further coupled to a second pump conduit 60*b* at an outlet 54*b* of the pump 54, and the reservoir 58 is further coupled to a reservoir conduit 60*c* at an inlet 58*a* of the reservoir 58. The second pump conduit 60*b* is selectively in communication with to the reservoir conduit 60*c*. The hydraulic drive unit 50 further includes a double-acting cylinder 62 and a piston 64 that is extendable from the cylinder 62, the piston 64 having the ram 42 at an end thereof. The cylinder 62 further includes a first cylinder conduit 60*d* coupled to a first cylinder port 62*a* and a second cylinder conduit 60*e* coupled to a second cylinder port 62*b*. Both the first and second cylinder conduits 60*d*, 60*e* are selectively in fluid communication with each of the second pump conduit and the reservoir conduit 60*c*.

The hydraulic drive unit 50 further includes a three-position valve 68 connected to the second pump conduit 60*b*, the first cylinder conduit 60*d*, the second cylinder conduit 60*e*, and the reservoir conduit 60*c*. The three-position valve 68 includes the lever 66 of the hydraulic drive unit 50, which is operable to move the three-position valve 68 between a neutral position A, an extending position B, and a retracting position C. In the neutral position A, the second pump conduit 60*b* is coupled to the reservoir conduit 60*c*, as illustrated in FIG. 8. As such, the pump 54 pumps hydraulic fluid from the outlet 58*b* of the reservoir 58 and back through the inlet 58*a* of the reservoir 58, such that there is no net change in the quantity of hydraulic fluid within the reservoir 58, and the piston 64 is not extended or retracted. In the extending position B, the second pump conduit 60*b* is coupled to the first cylinder conduit 60*d*, and the second cylinder conduit 60*e* is coupled to the reservoir conduit 60*c*.

As such, the pump 54 pumps hydraulic fluid from the outlet 58_b_ of the reservoir 58 and into the first cylinder port 62_a_, causing the piston 64 to extend from the cylinder 62. Furthermore, hydraulic fluid may be discharged from the second cylinder port 62_b_ and into the reservoir inlet 58_a_ as the piston 64 extends. In the extending position B, the ram 42 is extended with the piston 64 to engage and split a log. In the retracting position C, the reservoir conduit 60_c_ is coupled to the first cylinder conduit 60_d_, and the second pump conduit 60_b_ is coupled to the second cylinder conduit 60_e_. As such, the pump 54 pumps hydraulic fluid from the outlet 58_b_ of the reservoir 58 and into the second cylinder port 62_b_, retracting the piston 64 into the cylinder 62. Furthermore, hydraulic fluid may be discharged from the first cylinder port 62_a_ and into the reservoir inlet 58_a_ as the piston 64 retracts. In the retracting position C, the ram 42 is retracted with the piston 64 toward the cylinder 62 and away from the stop block 38.

The hydraulic drive unit 50 further includes a relief valve (not shown) integrated with the three-position valve 68. The relief valve is configured to allow flow of hydraulic fluid if the pressure within the any of the conduits connected to the three-position valve 68 exceeds a predetermined value. In some embodiments, if the pressure within the three-position valve 68 exceeds the predetermined value, hydraulic fluid will flow through the reservoir conduit 60_c_ into the reservoir 58. The hydraulic drive unit 50 further includes a pressure gauge 70 coupled to the second pump conduit 60_b_ for displaying a pressure of the hydraulic fluid within the second pump conduit 60_b_. The hydraulic drive unit 50 further includes an inline filter 72 coupled to the reservoir conduit 60_c_ and configured to filter hydraulic fluid returned into the reservoir inlet 58_a_.

Figure 9:
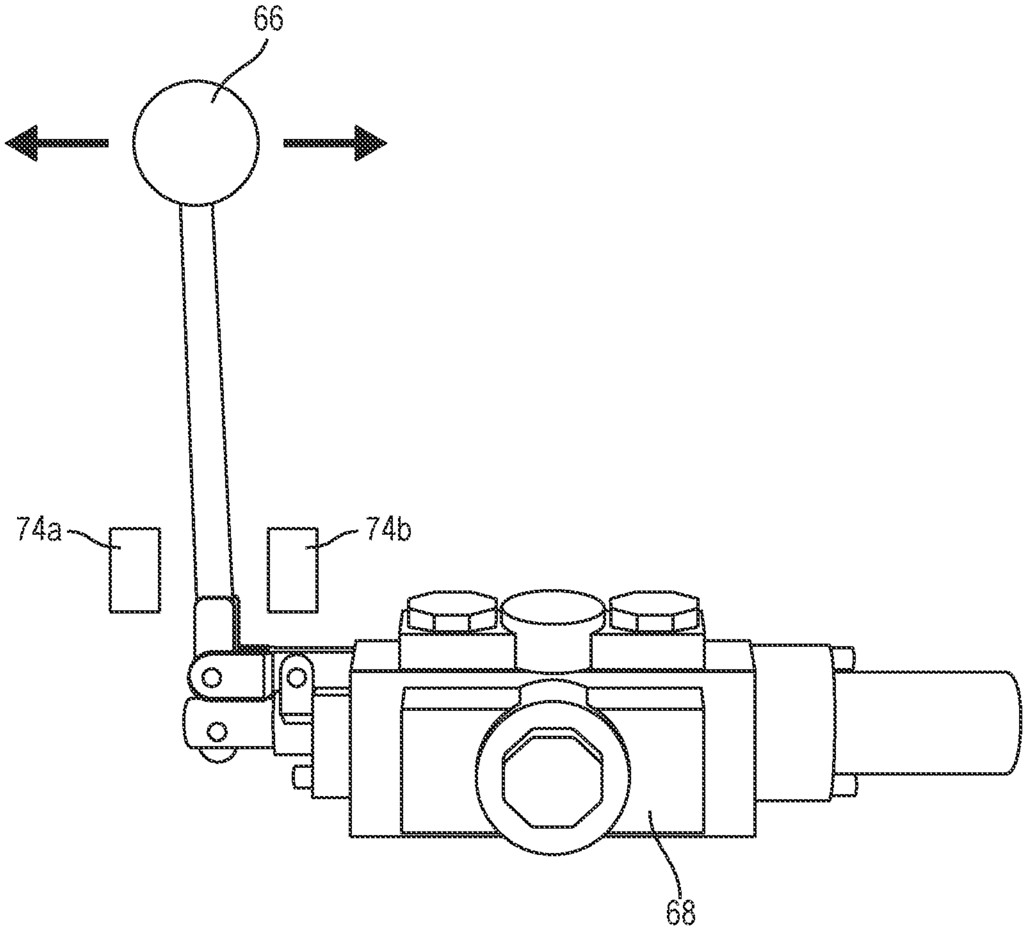
FIG. 9 is a perspective view of a valve of the hydraulic drive unit of FIG. 8 and a lever for adjusting the valve.

In a first embodiment, as illustrated in FIG. 9, the hydraulic drive unit 50 includes a first electronic limit switch 74_a_ adjacent a first side of the lever 66 and a second electronic limit switch 74_b_ adjacent the second side of the lever 66. Both the first and second limit switches 74_a_, 74_b_ are configured to detect the presence, or lack thereof, of the lever 66. The limit switches 74_a_, 74_b_ then communicate the position of the lever 66 to the control electronics 242. The controller 246 then determines the rotational speed of the power take-off shaft 238 to the pump 54 as will be described in more detail below.

Figure 10:
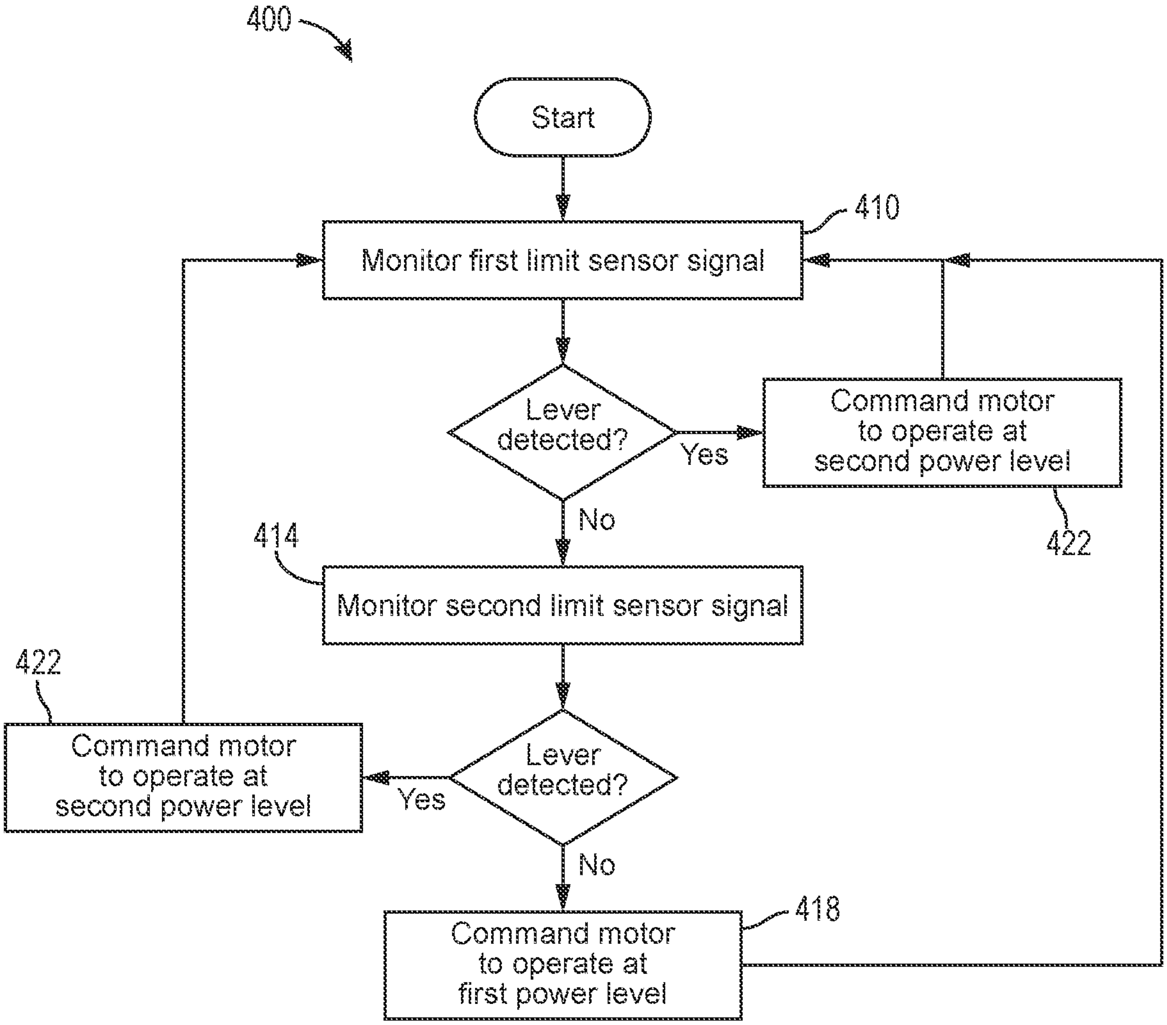
FIG. 10 illustrates a method of controlling the hydraulic drive unit of FIG. 8.

FIG. 10 illustrates a method 400 for operating the hydraulic drive unit 50 according to one embodiment. The controller 246 is electrically connected to the first and second limit switches 74_a_, 74_b_ and monitors signals from the limit switches 74_a_, 74_b_ that indicate the position of the lever 66 (step 410 and 414). As such, the controller 246 is configured to determine whether the lever 66 is in the neutral position or one of the first and second positions. The lever 66 is moveable between a first position (to the left in FIG. 9) corresponding to the extending position of the three-position valve 68, a second position (to the right in FIG. 9) corresponding to the retracting position of the three-position valve 68, and a center position corresponding to the neutral position of the three-position valve 68.

When the lever 66 is in the center position, neither of the limit switches 74_a_, 74_b_ detects the lever 66 and both limit switches 74_a_, 74_b_ send respective signals to the controller 246 indicating that the lever 66 has not been detected. In response, the controller 246 commands the motor unit 44 to operate at a first power level (step 418). It should be noted that power and throttle are used interchangeably to refer to the output speed torque provided to the power take-off shaft 238 receives from the motor 236. In the illustrated embodiment, the first power level is less than a full power level. In other words, when the motor unit 44 operates at the first power level, the power take-off shaft 238 has a rotational speed that is less than the max output. As such, only a fraction of the total torque of the motor unit 44 is transferred from the power take-off shaft 238 to the pump 54. In some embodiments, the full power of the power take-off shaft 238 is between 2,000 RPMs and 5,000 RPMs. In other embodiments, full power of the power take-off shaft 238 is less than 2,000 RPMs or greater than 5,000 RPMs. In further embodiments, the first power level may be zero and thus the motor unit 44 remains deactivated.

When the lever 66 is moved into the first position, the first limit switch 74_a_ detects that the lever 66 is in the first position and the first limit switch 74_a_ sends a signal 422 to the controller 246 indicating that the three-position valve 68 is in the extending position. In response, the controller 246 commands the motor unit 44 to operate at a second power level (step 422). In the illustrated embodiment, the second power level is approximately equal to full power or near full power. In other words, when the motor unit 44 operates at the second power, the power take-off shaft 238 has a rotational speed that is at its highest. A such, full torque is transferred from the power take-off shaft 238 to the pump 54. When the lever 66 is moved into the second position, the second limit switch 74_b_ detects that the lever 66 is in the second position and the second limit switch 74_b_ sends a signal 422 to the controller 246 indicating that the three-position valve 68 is in the retracting position. In response, the controller 246 commands the motor unit 44 to operate at the second power level (step 422). Accordingly, the motor unit 44 operates at full power or near-full power when the piston 64 is extending or retracting. As such, when in the neutral position, power supply from the battery pack 250 to the motor 236 of the motor unit 44 is reduced, increasing the runtime of the battery pack 250 and the motor unit 44.

Figure 11:
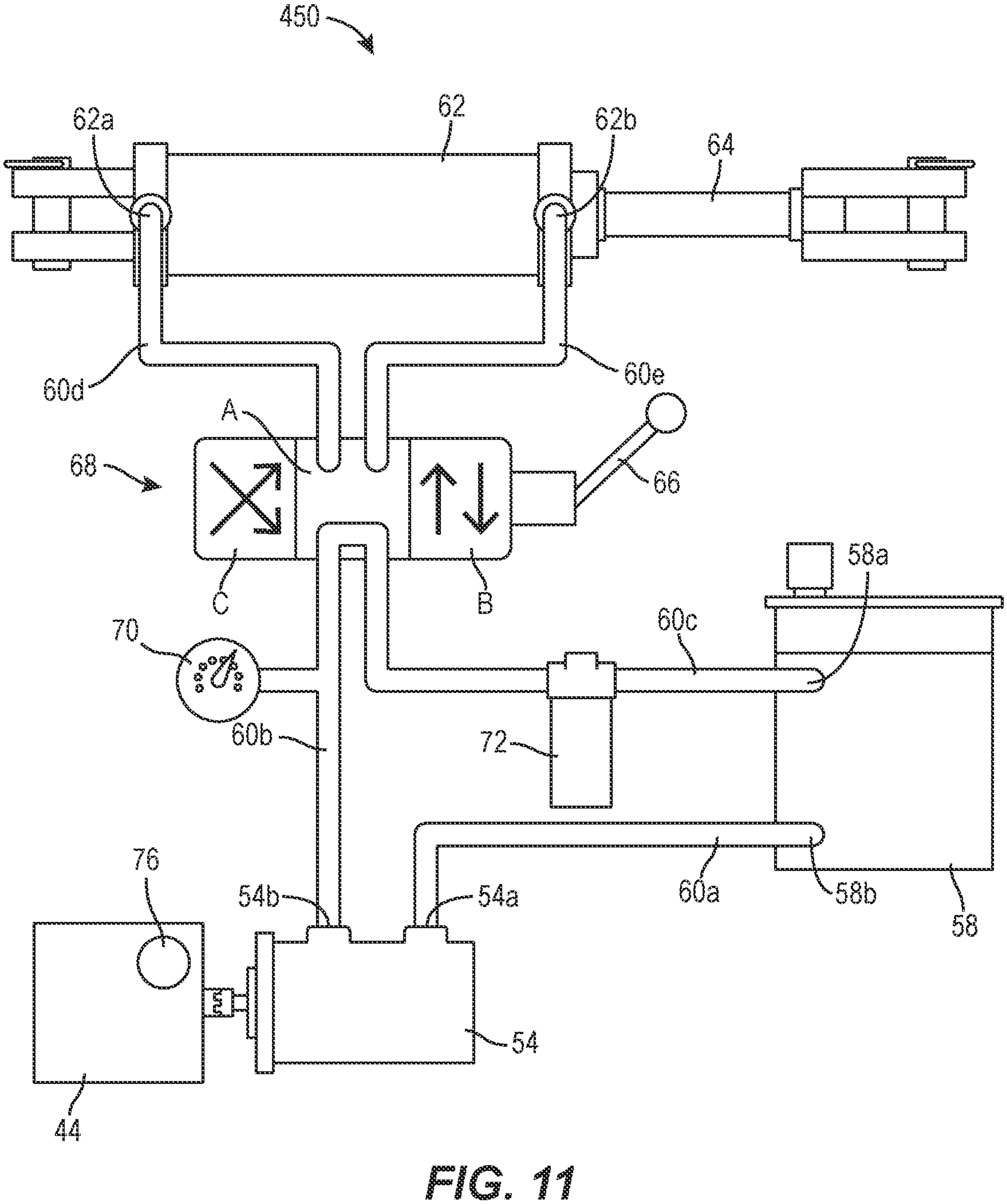
FIG. 11 is a schematic view of a hydraulic drive unit of the log splitter of FIG. 1A according to another embodiment.

FIG. 11 illustrates a hydraulic drive unit 450 according to another embodiment. The hydraulic drive unit 450 is like the hydraulic drive unit 50 discussed above with like features being represented with like reference numbers. The hydraulic drive unit 450 further includes a load sensor 76 coupled to the motor 236 of the motor unit 44 and configured to detect a load on the motor 236 during operation of the log splitter 10. In some embodiments, the load sensor 76 detects the output torque of the power take-off shaft 238. In other embodiments, the load sensor 76 may detect the electrical current drawn by the motor 236 or other parameters of the motor 236. The load sensor 76 then communicates the load of the motor 236 to the controller 246 to control operation of the motor unit 44.

Figure 12:
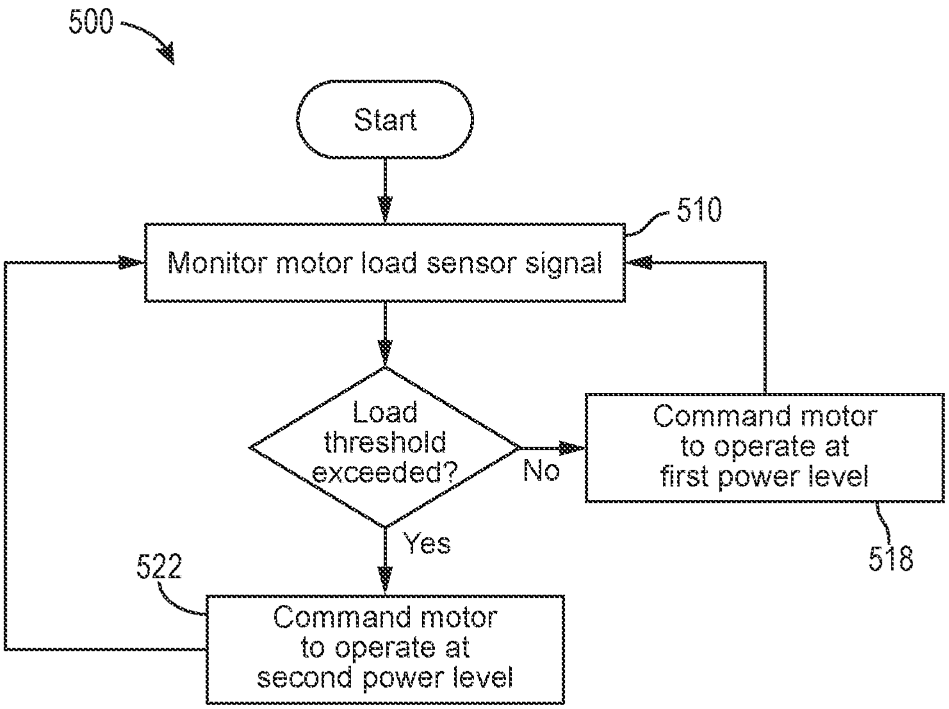
FIG. 12 illustrates a method of controlling the hydraulic drive unit of FIG. 11.

FIG. 12 illustrates a method 500 for operating the hydraulic drive unit 450. The controller 246 is electrically connected to the load sensor 76 and monitors a load of the electric motor 236 (step 510). When the three-position valve 68 of the hydraulic drive unit 450 is in the neutral position, the motor 236 experiences a first load as a result of the pump 54 recycling hydraulic fluid with the reservoir 58. When the three-position valve 68 is in the extending position and the retracting position, the motor 236 experiences a second load and a third load, respectively, as a result of the pump 54 operating the cylinder 62. In the illustrated embodiment, the first load is lower than a predetermined load threshold, and the second and third loads are higher than the predetermined load threshold.

The controller 246 is electrically connected to the load sensor 76 and monitors a load sensor signal 510 that indicates the load on the motor 236. The controller 246 is configured to determine whether the load on the motor 52 has exceed the predetermined load threshold. When the controller 246 receives a signal indicating that the load on the motor 236 is below the load threshold, the controller 246 commands the motor 236 to operate at a first power level, which is less than full power (step 518). When the controller 246 receives a signal 522 indicating that the load on the motor 236 is above the load threshold, the controller 246 commands the motor 236 to operate at a second power level, which is approximately equal to full power (step 522). Accordingly, the motor 236 operates at full power when the piston 64 is extending or retracting and at less than half power when the piston 64 is stationary. In an alternative embodiment, the motor 236 may operate at third power level that is more than the first power level but less than the second power level when the piston 64 is retracting.

Figure 13:
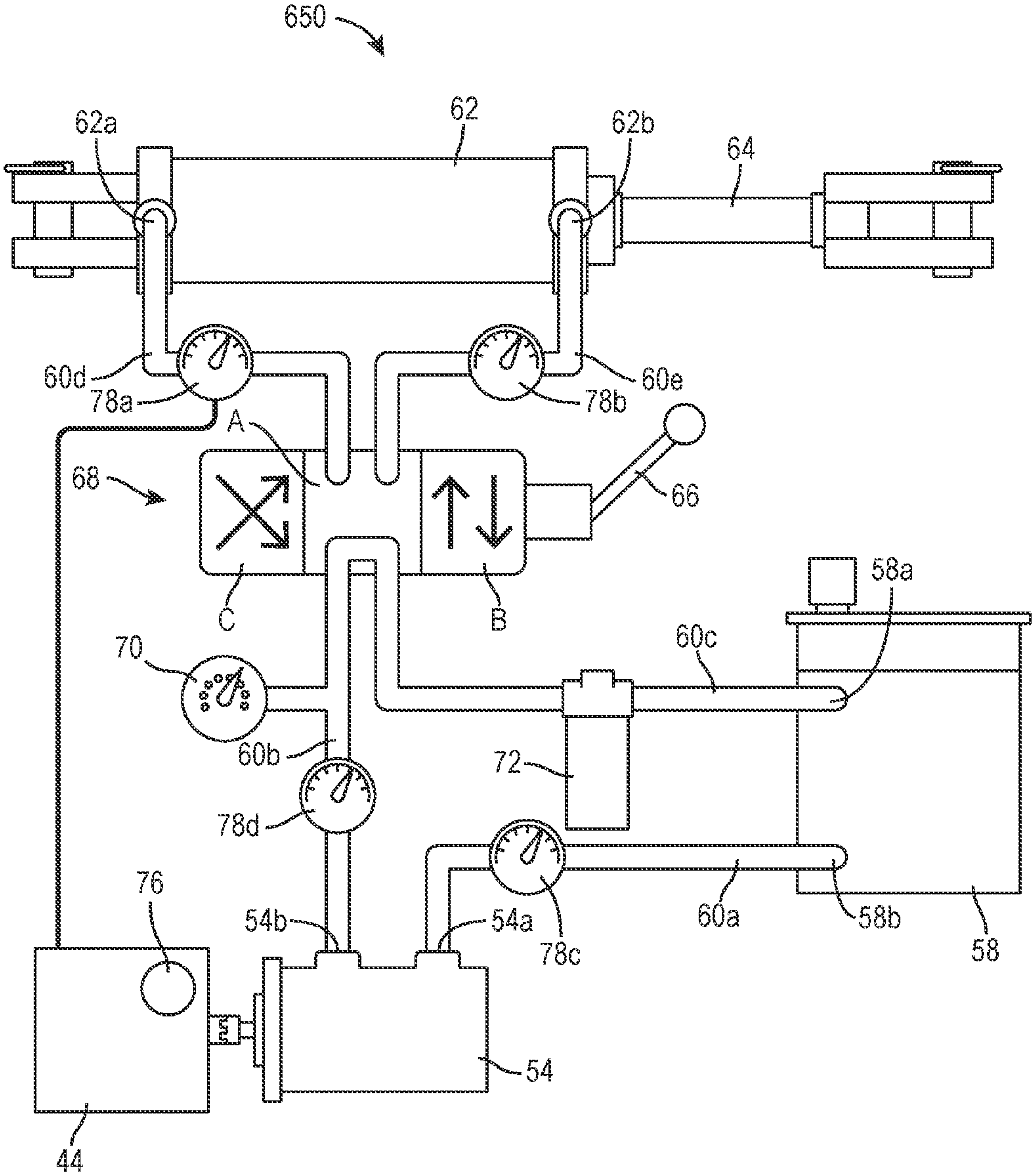
FIG. 13 is a schematic view of a hydraulic drive unit of the log splitter of FIG. 1A according to another embodiment.

FIG. 13 illustrates a hydraulic drive unit 650 according to another embodiment. The hydraulic drive unit 650 is like the hydraulic drive unit 50 discussed above with like features being represented with like reference numbers. The hydraulic drive unit 650 further includes a fluid sensor 78*a* coupled to the first cylinder conduit 60*d* and configured to detect a characteristic of the hydraulic fluid within the first cylinder conduit 60*d*. In other embodiments, a fluid sensor 78*b* may be coupled to the second cylinder conduit 60*e*, a fluid sensor 78*c* may be coupled to the first pump conduit 60*a*, or a fluid sensor 78*d* may be coupled to the second pump conduit 60*b* in place of the fluid sensor 78*a* coupled to the first cylinder conduit 60*d*. In the illustrated example the fluid sensor 78*a* is a pressure sensor. In other embodiments, the fluid sensor 78*a* may be a flow rate sensor or other sensor.

Figure 14:
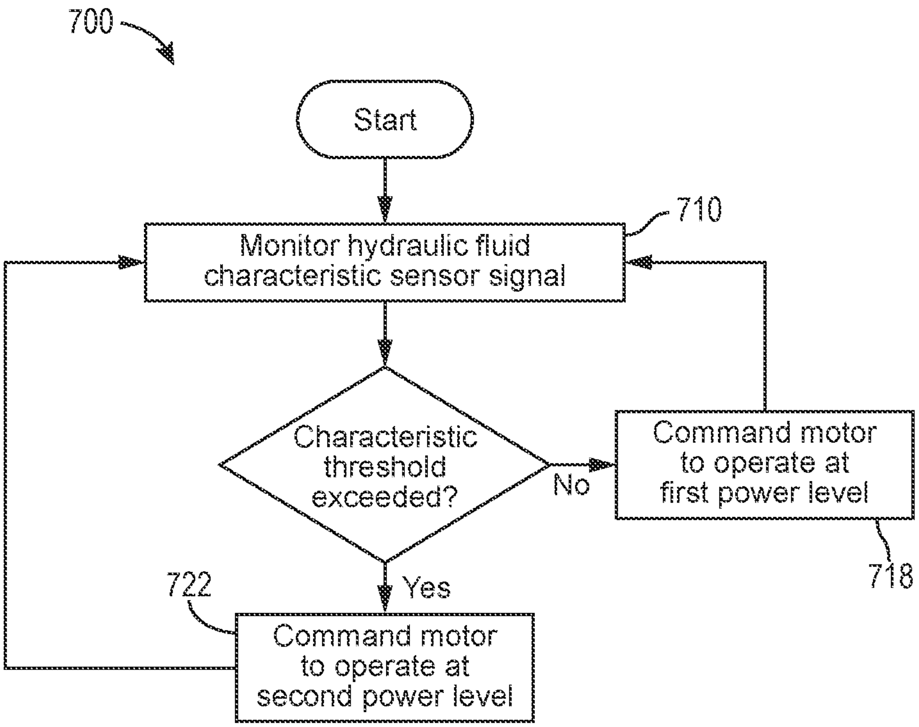
FIG. 14 illustrates a method of controlling the hydraulic drive unit of FIG. 13.

FIG. 14 illustrates a method 700 for operating the hydraulic drive unit 650. The controller 246 is electrically connected to the pressure sensor 78*a* and monitors a pressure signal that indicates the pressure of the hydraulic fluid (step 710). The controller 246 is configured to determine whether the detected characteristic (i.e., the pressure) of the hydraulic fluid is below or exceeds a predetermined threshold (i.e., a predetermined pressure threshold). When the three-position valve 68 of the hydraulic drive unit 650 is in the neutral position, the pressure sensor 78*a* detects a first pressure as a result of the pump 54 recycling hydraulic fluid with the reservoir 58. When the three-position valve 68 is in the extending position and the retracting position, the pressure sensor 78*a* detects a second pressure and a third pressure, respectively, as a result of the pump 54 operating the cylinder 62. The first pressure is higher than the predetermined pressure threshold, and the second and third pressures are lower than the predetermined pressure threshold.

When the controller 246 receives a signal indicating that the pressure within the first cylinder conduit 60*d* is below the pressure threshold, the controller 246 commands the motor 236 to operate at a first power level, which is less than full power (step 718). When the controller 246 receives a signal indicating that the pressure within the first cylinder conduit 60*d* is above the pressure threshold, the controller 246 commands the motor 236 to operate at a second power level, which is approximately equal to full power (step 722). Accordingly, the motor 236 operates at full power when the piston 64 is extending or retracting and at less than half power when the piston 64 is stationary. In an alternative embodiment, the motor 236 may operate at full power when the piston 64 is extending, between half power and full power when the piston 64 is retracting, and less than half power when the piston 64 is stationary. In other words, the motor 236 may operate at a third power level when the piston 64 is retracting that is higher than the first power level but less than the second power level.

Figure 15:
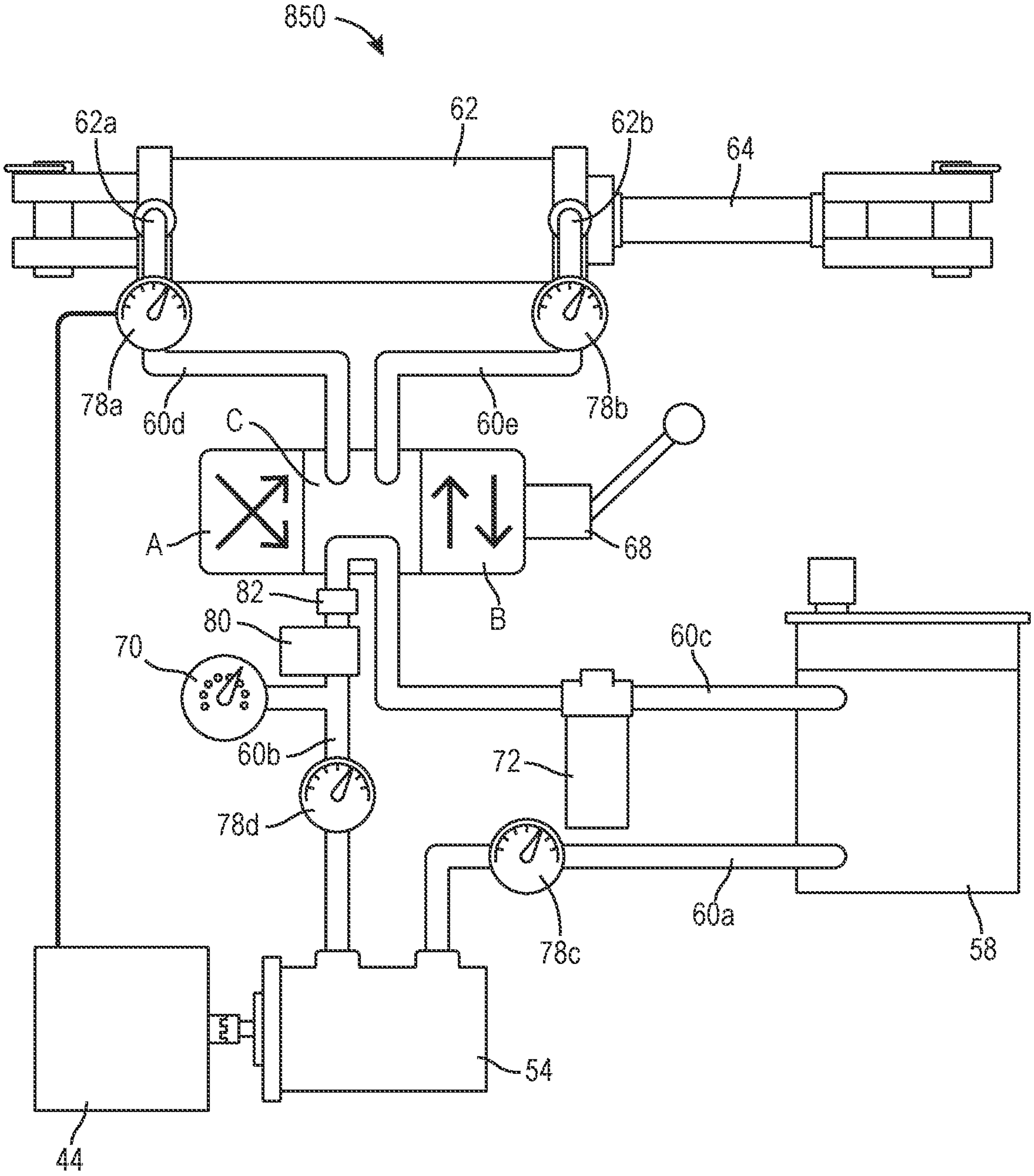
FIG. 15 is a schematic view of a hydraulic drive unit of the log splitter of FIG. 1A according to another embodiment.

FIG. 15 illustrates a hydraulic drive unit 850 according to another embodiment. The hydraulic drive unit 850 is like the hydraulic drive unit 650 discussed above with like features being represented with like reference numbers. The hydraulic drive unit 850 further includes a hydraulic accumulator 80 in fluid communication with the second pump conduit 60*b* and the three-position valve 68. The hydraulic accumulator 80 is configured to be filled with hydraulic fluid from the pump 54 and maintains the hydraulic fluid at a desired pressure. When the three-position valve 68 changes state from the neutral position A, the hydraulic fluid is released from the hydraulic accumulator 80 and into the first cylinder conduit 60*d* or the second cylinder conduit 60*e*. The hydraulic accumulator 80 further includes a one-way valve 82 to prevent hydraulic fluid from flowing from the first cylinder conduit 60*d* or the second cylinder conduit 60*e* into the first cylinder conduit 60*b*. In some embodiments, the hydraulic accumulator 80 may be a bladder hydraulic accumulator, a diaphragm hydraulic accumulator, or a piston hydraulic accumulator.

Figure 16:
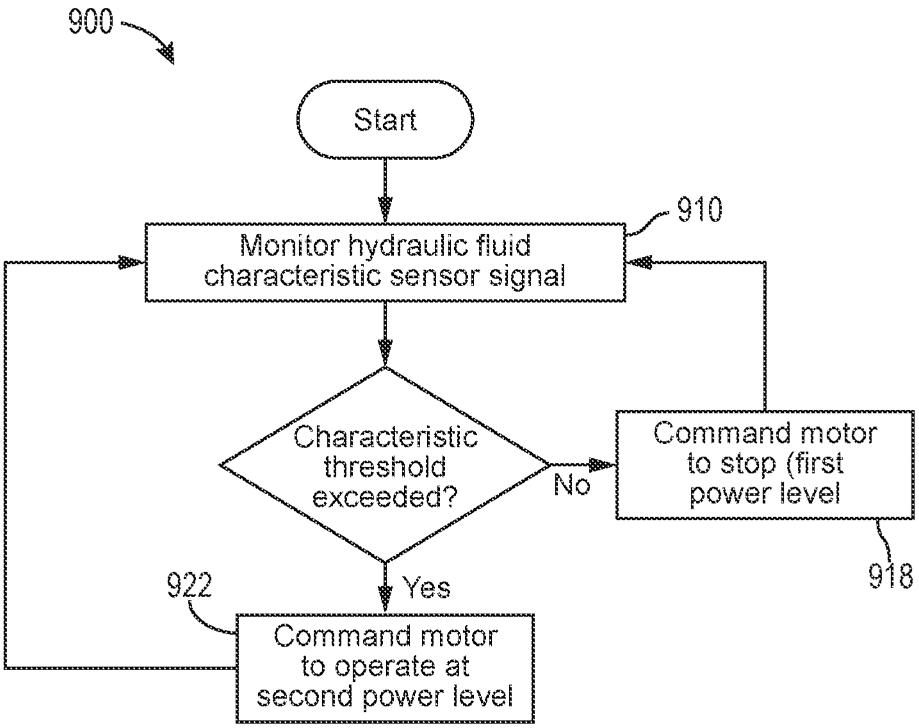
FIG. 16 illustrates a method of controlling the hydraulic drive unit of FIG. 15.

FIG. 16 illustrates a method 900 for operating the hydraulic drive unit 850 according to another embodiment. The method 900 for operating the hydraulic drive unit 850 is like the method 700 discussed above with like features being represented with like reference numbers. The controller 246 is electrically connected to the pressure sensor 78*a* and monitors a pressure signal of the hydraulic fluid (step 910). The controller 246 is configured to determine whether the detected characteristic (i.e., the pressure) of the hydraulic fluid is below or exceeds a predetermined threshold (i.e., a predetermined pressure threshold). When the three-position valve 68 is in a neutral position A, the pressure sensor 78*a* detects a first pressure. When the three-position valve 68 is in the extending position and the retracting position, the pressure sensor 78*a* detects a second and a third pressure, respectively. The first pressure is higher than the predetermined pressure threshold, and the second and third pressures are lower than the predetermined threshold.

When the controller 246 receives a pressure signal indicating that the pressure within the first cylinder conduit 60*d* is below the pressure threshold, the controller 246 stops the motor 236 or runs in an idle mode (a first power level; step 918). As a result, the hydraulic fluid stops flowing within the first pump conduit 60*a*, the second pump conduit 60*b*, and the reservoir conduits 60*c*. The hydraulic accumulator 80 holds the hydraulic fluid at a predetermined pressure so the motor 236 can be stopped, which increases the runtime of the battery pack 250 and the motor unit 44. When the controller 246 receives a signal indicating that the pressure within the first cylinder conduit 60*d* is above the pressure threshold, the controller 246 commands the motor 236 to operate at a second power level (step 922), which is approximately equal to full power. At full power, the motor 236 and the two-stage pump 54 work to extend or retract the piston 64. When the motor 236 is stopped, the piston 64 maintains its position. In an alternative embodiment, the motor 236 may operate at full power when the piston 64 is extending, less than full power when the piston 64 is retracting, and be fully turned off when the piston 64 is stationary. In other words, the motor 236 may operate at a third power level when the piston 64 is retracting that is less than the second power level.

Various features of the disclosure are set forth in the following claims.

What is claimed is:

1. A powered log splitter comprising:

a support structure configured to support a log;

a ram operable to engage and split the log;

a hydraulic drive unit configured to actuate the ram; and a stand-alone motor unit configured to power the hydraulic drive unit, the stand-alone motor unit comprising a housing, an electric motor located within the housing, and a battery pack removably coupled to the housing, the battery pack is configured to supply electrical current to the electric motor.

2. The powered log splitter of claim 1, wherein the stand-alone motor unit further includes a stator, a rotor supported for rotation relative to the stator, and a power take-off shaft receiving torque from the rotor, the power-take off shaft coupled to the hydraulic drive unit to power the hydraulic drive unit, the power take-off shaft receiving torque from the motor, the power take-off shaft extending from the housing and coupled to the hydraulic drive unit.

3. The powered log splitter of claim 1, wherein the electric motor includes a power output of at least 500 W.

4. The powered log splitter of claim 3, wherein the electric motor has a nominal outer diameter between 100 mm and 200 mm.

5. The powered log splitter of claim 1, further comprising a sensor for measuring a characteristic of the hydraulic drive unit or the stand-alone motor unit.

6. The powered log splitter of claim 5, wherein the sensor is a load sensor configured to determine a load of the motor.

7. The powered log splitter of claim 5, wherein the sensor is a pressure sensor configured to determine a hydraulic pressure within the hydraulic drive unit.

8. The powered log splitter of claim 1, wherein the hydraulic drive unit further includes a two-stage pump coupled to the electric motor, a reservoir in fluid communication with the two-stage pump, the reservoir configured to store hydraulic fluid, a double-acting cylinder selectively in fluid communication with the reservoir and the two-stage pump, a piston extendable from the double-acting cylinder, the piston coupled to the ram, and a three-position valve configured to selectively fluidly connect the double-acting cylinder to the two-stage pump and the reservoir.

9. The powered log splitter of claim 8 further comprising an actuator configured to adjust the three-position valve.

10. The powered log splitter of claim 9, further comprising a limit switch positioned adjacent the actuator to determine a position of the actuator.

11. The powered log splitter of claim 1, wherein the hydraulic drive unit includes an accumulator configured to store hydraulic fluid at a predetermined pressure.

12. The powered log splitter of claim 11, wherein the accumulator includes a one-way valve.

13. The powered log splitter of claim 1, wherein the support structure includes a stop block, and wherein the log is positioned between the stop block and the ram.

14. The powered log splitter of claim 1, wherein the ram is wedge-shaped.

15. A method of operating a log splitter including a hydraulic drive unit and a stand-alone motor unit to power the log splitter, the stand-alone motor unit including an electric motor and a battery pack to supply electrical current to the electric motor, the method comprising:

providing an actuator to activate the hydraulic drive unit;

monitoring, with a controller, a first sensor signal from a first sensor configured to detect a first position of the actuator;

monitoring, with the controller, a second sensor signal from a second sensor configured to detect a second position of the actuator;

commanding, in response to an absence of the first sensor signal or the second sensor signal, the electric motor to operate at a first non-zero power level; and commanding, in response to the controller detecting either the first sensor signal or the second sensor signal, the electric motor to operate at a second non-zero power level, the second non-zero power level being different from the first non-zero level.

16. The method of claim 15, wherein commanding the electric motor to operate at the second power level drives the electric motor at a higher rotational speed than when commanding the electric motor to operate at the first power level.

17. The method of claim 15, wherein the first sensor and the second sensor are limit switches.

18. The method of claim 15, wherein the actuator is a lever.

19. The method of claim 15, wherein the hydraulic drive unit includes a multi-position valve operable in a first neutral position, in which, the motor operates at the first power level, and a second position, in which, the motor operates at the second power level.

20. The method of claim 15, further comprising activating a piston of the hydraulic drive unit in response to the controller detecting either the first sensor signal or the second sensor signal.

* * * * *